(No Model.)

C. A. CATLIN.
CRAYON.

No. 248,845. Patented Nov. 1, 1881.

WITNESSES:
John J. Colton
James J. Nolan Jr.

INVENTOR:
Charles A. Catlin
By Walter B. Vincent Atty.

UNITED STATES PATENT OFFICE.

CHARLES A. CATLIN, OF PROVIDENCE, RHODE ISLAND.

CRAYON.

SPECIFICATION forming part of Letters Patent No. 248,845, dated November 1, 1881.

Application filed January 27, 1881. (No model.)

*To all whom it may concern:*

Be it known that I, CHARLES A. CATLIN, of Providence, in the State of Rhode Island, have made certain new and useful Improvements in Crayons; and I do hereby declare that the following specification, taken in connection with the drawings making a part of the same, is a full, clear, and exact description thereof.

Figure 1:
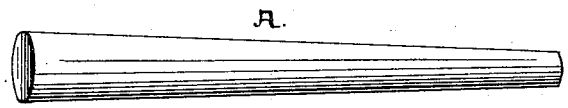
Figure 2:
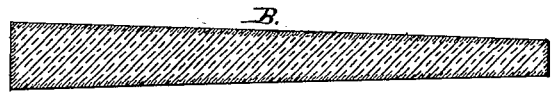

Figure 1 is a view of the crayon. Fig. 2 is a longitudinal section of same.

The object of my invention is to produce a crayon which may be used without soiling the hands, and at the same time retain its abrading character in contact with a blackboard or other marking surfaces; and it consists in hardening the exterior thereof, as hereinafter described.

It is well understood that a crayon which is soft enough to crumble easily will crock the fingers, and that its use is both dirty and disagreeable. In my invention I overcome this difficulty by hardening the surface of the crayon A, Fig. 1, and transforming its exterior into a thin hardened film, as shown at B, Fig. 2, which will crumble easily, but which, in continuous surface, will be sufficiently cohesive to avoid abrasion of the crayon-surface in the handling of the article.

The ordinary "white-chalk" crayon, as it is called, in which plaster-of-paris is by far the larger and sometimes the only ingredient, I dip into a solution of alum, which hardens the exterior of the plaster cast. Through this treatment the exterior of the crayon is turned into a hardened film of plaster, B, Fig. 2, of greater or less thickness, according to the length of time the cast is allowed to remain in the solution and the depth to which it penetrates.

I sometimes find it necessary, in case the crayons are very porous and dry, to moisten them with water before dipping in the hardening solution, so that the latter will not penetrate too far and harden the crayon to too great a depth and destroy its friable quality.

I am aware that other salts than alum possess the properties necessary to harden plaster-of-paris casts, but I find alum the best suited for the purpose.

What I claim as my invention, and desire to secure by Letters Patent, is—

A crayon having its exterior surface hardened by dipping in solution, as described, as and for the purposes specified.

CHAS. A. CATLIN.

Witnesses:
 WALTER B. VINCENT,
 JOHN J. COLTON.